(12) United States Patent
McDermott et al.

(10) Patent No.: US 12,287,072 B1
(45) Date of Patent: Apr. 29, 2025

(54) PLURAL SPECTRUM LOCATOR LIGHTING DEVICE

(71) Applicant: Damien McDermott, Rockledge, FL (US)

(72) Inventors: Damien McDermott, Rockledge, FL (US); Matthew Bowes, Cocoa, FL (US)

(73) Assignee: MCDERMOTT, DAMIEN, Rockledge, FL (US)

( * ) Notice: Subject to any disclaimer, the term of this patent is extended or adjusted under 35 U.S.C. 154(b) by 0 days.

(21) Appl. No.: 18/392,683

(22) Filed: Dec. 21, 2023

(51) Int. Cl.
*F21L 4/02* (2006.01)
*F21K 9/66* (2016.01)
(Continued)

(52) U.S. Cl.
CPC ............. *F21L 4/027* (2013.01); *F21K 9/66* (2016.08); *F21L 4/085* (2013.01); *F21V 21/008* (2013.01); *F21V 21/0885* (2013.01); *F21V 21/0965* (2013.01); *F21V 23/005* (2013.01); *F21V 23/0414* (2013.01); *F21V 23/0464* (2013.01); *H05B 47/11* (2020.01); *H05B 47/17* (2020.01);
(Continued)

(58) Field of Classification Search
CPC ... F21L 4/02; F21L 4/022; F21L 4/027; F21L 4/085; F21K 9/66; F21V 21/008; F21V 21/0885; F21V 21/0965; F21V 23/005; F21V 23/0414; F21V 23/0464; F21V 23/0407; F21V 31/005; F21V 33/0076; H05B 47/11; H05B 47/17; H05B 47/165; F21W 2111/10; F21Y 2113/30; F21Y 2115/10; H02J 7/0049; H02J 2207/30
See application file for complete search history.

(56) References Cited

U.S. PATENT DOCUMENTS

| 10,274,190 B2 * | 4/2019 | Matte ................... G08B 5/36 |
| 2016/0341418 A1 * | 11/2016 | Leegate ................ F21L 4/00 |

(Continued)

FOREIGN PATENT DOCUMENTS

| KR | 20160113337 A * | 9/2016 | ............. F21L 4/085 |
| KR | 101742976 B1 * | 6/2017 | ............. F21L 4/025 |

(Continued)

OTHER PUBLICATIONS

Kim I S, "Description KR101742976B1", Jun. 5, 2017, EPO Patent Translate, pp. 1-40. (Year: 2017).*

(Continued)

*Primary Examiner* — Alan B Cariaso
(74) *Attorney, Agent, or Firm* — HAUPTMAN HAM, LLP

(57) ABSTRACT

A lighting device including a housing; an at least partially transparent protrusion connected with a first surface of the housing; a light source within the protrusion, the light source being configured to emit light in a visible spectrum and a non-visible spectrum; a controller within the housing and configured to control the light source to emit light in a pattern including both visible spectrum and non-visible spectrum; a power source within the housing and electrically connected with the controller and the light source, the power source configured to provide sufficient power to the lighting device to operate for at least 3 weeks of constant light source light emission; and a switch extending through a third surface of the housing and configured to provide input to the controller.

37 Claims, 12 Drawing Sheets

(51) Int. Cl.

| | |
|---|---|
| *F21L 4/08* | (2006.01) |
| *F21V 21/008* | (2006.01) |
| *F21V 21/088* | (2006.01) |
| *F21V 21/096* | (2006.01) |
| *F21V 23/00* | (2015.01) |
| *F21V 23/04* | (2006.01) |
| *F21V 31/00* | (2006.01) |
| *F21V 33/00* | (2006.01) |
| *F21W 111/10* | (2006.01) |
| *F21Y 113/00* | (2016.01) |
| *F21Y 115/10* | (2016.01) |
| *H02J 7/00* | (2006.01) |
| *H05B 47/11* | (2020.01) |
| *H05B 47/165* | (2020.01) |
| *H05B 47/17* | (2020.01) |

(52) U.S. Cl.
CPC ......... *F21V 23/0407* (2013.01); *F21V 31/005* (2013.01); *F21V 33/0076* (2013.01); *F21W 2111/10* (2013.01); *F21Y 2113/30* (2023.05); *F21Y 2115/10* (2016.08); *H02J 7/0049* (2020.01); *H02J 2207/30* (2020.01); *H05B 47/165* (2020.01)

(56) References Cited

U.S. PATENT DOCUMENTS

2020/0217496 A1* 7/2020 Dir ........................... F21L 4/025
2020/0240597 A1* 7/2020 Poirier ................. F21S 10/023

FOREIGN PATENT DOCUMENTS

| WO | WO-2020025916 A1 * | 2/2020 | ............... B60Q 7/00 |
| WO | WO-2021222804 A1 * | 11/2021 | ............... A61L 2/10 |

OTHER PUBLICATIONS

Chung T K, "Description KR20160113337A", Sep. 29, 2016, EPO Patent Translate, pp. 1-8 (Year: 2016).*

* cited by examiner

PLURAL SPECTRUM LOCATOR LIGHTING DEVICE

BACKGROUND

As part of military training, soldiers are often required to spend time in the field sleeping on the ground or in tents. For Army National Guard soldiers, this happens during their 2-week annual training. The National Training Center at Fort Irwin, California is a common location for both Active Duty and Guard soldiers to live in the field for weeks and hone their craft. Exercises occur at all times of the day and at night. Soldiers commonly sleep in, under, or next to their vehicles or in individual tents. The problem with sleeping like this is that other soldiers driving at night (with or without Night Vision Goggles (NVGs)) do not always see them, so they run over the tents or crash into the vehicles. Sometimes these wounded soldiers can be airlifted for medical help; and sometimes the injuries are so severe that nothing can be done.

Similarly, firefighters battling wildfires across the nation will often collapse from exhaustion right next to their firetrucks and also not be seen by someone driving by them and also get run over.

One would think that being near or under a truck would keep them safe. This is not the case. Everyone sleeping in the field, whether for training or not, should be marked at night. They should be marked with something that will give them both naked eye and NVG visibility by something that will last a long time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
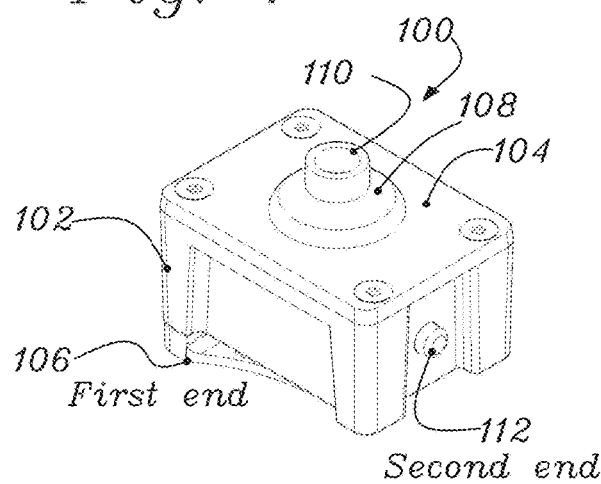
FIG. 1 is a perspective view of a lighting device, in accordance with an embodiment.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Currently there are devices out there designed to illuminate or mark objects using light sources. These devices don't operate long enough without replacing the batteries or recharging them and require the operator to perform extra steps such as replacing batteries, charging, and turning them on daily which are easily forgotten. Although some existing devices have clips to attach them to objects, they often don't hold them securely in place and allow the device to rotate thus limiting their visibility. Existing devices also have attachments such as straps and brackets that when installed can limit their visibility. Existing products don't have dark activation sensors to only operate the light during periods of darkness which makes them inefficient and reduces battery life.

Other approaches have not produced a Plural Spectrum Locator Lighting Device that is compact, highly efficient, and lasts for over three weeks without recharging or replacing the batteries.

Other approaches have not produced a Plural Spectrum Locator Lighting Device that is compact and easy to attach to a tent or other device while remaining in a horizontal position.

Other approaches have not produced a Plural Spectrum Locator Lighting Device that has concentrated 360-degree visibility in the azimuthal direction.

Other approaches have not produced a Plural Spectrum Locator Lighting Device that has a dark activation sensor.

Other approaches have not produced a Plural Spectrum Locator Lighting Device that has a cord lock designed to work with widely used 550 parachute cord to keep it in position.

Other approaches have not produced a Plural Spectrum Locator Lighting Device with transparent housing as well as transparent accessories including mounts or brackets a that would allow visibility in all directions.

Other approaches have not produced a Plural Spectrum Locator Lighting Device with a visual indicator to let the user know that the infrared light is operational.

At least one embodiment includes a lighting device including a housing; an at least partially transparent protrusion connected with a first surface of the housing; a light source within the protrusion; a controller within the housing; a power source within the housing and electrically connected with the controller and the light source; a bracket connected with a second surface of the housing; a light sensor connected with the controller; and a switch extending through a third surface of the housing and configured to provide input to the controller. In at least one embodiment, the light source is configured to emit light in a visible spectrum and a non-visible spectrum. In at least one embodiment, the controller is configured to control the light source to emit light in a pattern including both visible spectrum and non-visible spectrum. In at least one embodiment, the light sensor is configured to provide input to the controller based on a level of light detected by the light sensor.

FIG. 1 is a perspective view of a lighting device 100, in accordance with an embodiment.

Lighting device 100 comprises a housing 102, an optical surface 104, and a bracket 106. Housing 102 is substantially rectangular parallelepiped having an interior cavity for receiving additional components. In some embodiments, housing 102 is other than rectangular-shaped, for example, cylindrical, square, or other shape housing.

Housing 102 has rectangular indentations along each of the side surface between the optical surface 104 and bracket 106. The upper portion of the indentations closest to the optical surface 104 are not indented and align with the outer perimeter of the optical surface.

Housing 102 is substantially transparent. In some embodiments, housing 102 is translucent. In some embodiments, housing 102 is opaque.

Housing 102 has an upper surface open to the interior cavity. The upper surface is covered by the optical surface 104.

Lighting device 102 has a length of 49 mm, a width of 30 mm, and a height or depth of 36 mm. In some embodiments, one or more of the length, width, or height is varied to meet a particular use case. As the dimensions increase, the lighting device 100 requires additional space for use and/or storage which impacts the ability to easily carry the device by a user. Additionally, added material is required increasing cost of production. In at least one embodiment, the dimensions of the housing are selected in order for the housing to be stable, easy to mold, large enough for a lens, switch, dark activation sensor, battery and charging port, but still small and compact.

Lighting device 100 weighs 27 grams. In some embodiments, the lighting device 100 has a larger or smaller weight. In at least one embodiment using a smaller battery, the lighting device weighs 23 grams. As the weight increases, the desirability of carrying the lighting device by the user may be decreased.

The optical surface has a semispherical protrusion 108 extending away from the interior cavity of housing 102. The semispherical protrusion 108 includes a cylindrical protrusion 110 atop and extending away from the semispherical protrusion. The cylindrical protrusion 110 is aligned with the top of the semispherical protrusion 108. The cylindrical protrusion 110 and the semispherical protrusion 110 are hollow and open into the interior cavity of housing 102 through a corresponding opening in the optical surface 104 of which they form a part.

Cylindrical protrusion 110 and semispherical protrusion 108 are an integrally formed part of optical surface 104. In some embodiments, the cylindrical protrusion 110 is separately joined to the semispherical protrusion 110. In some embodiments, the semispherical protrusion 110 is separately joined to the optical surface 104.

Optical surface 104, including semispherical protrusion 108 and cylindrical protrusion 110, is transparent. In some embodiments, optical surface 104 is translucent, opaque, or a combination thereof. In some embodiments, semispherical protrusion 108 is translucent, opaque, or a combination thereof. In some embodiments, cylindrical protrusion 110 is translucent, opaque, or a combination thereof.

Cylindrical protrusion 110 is the highest portion of optical surface 104 when the lighting device 100 is on a surface such that the bracket 106 is on the bottom.

Optical surface 104 is substantially planar and configured to enable light emitted through either or both of semispherical protrusion 108 or cylindrical protrusion 110 to exit the lighting device 100 without being interrupted by another portion of the lighting device. Light emitted through at least one of the semispherical protrusion 108 or the cylindrical protrusion 110 exits the lighting device 100 in a 360° azimuthal direction.

A set of four screws attach optical surface 104 to housing 102 and thereby seal the interior cavity of the housing. In some embodiments, another mechanism is used to attach optical surface 104 to housing 102, e.g., glue, snap-fit, ultrasonic welding, or the like. Each corner of housing 102 includes a threaded receiver into which one of the set of four screws is inserted to retain the optical surface 104 in place.

In some embodiments, the optical surface 104 attached to housing 102 forms a watertight or water-resistant seal preventing water from entering the interior cavity.

Bracket 106 is attached to the base or bottom surface of housing 102. Bracket 106 is transparent. In some embodiments, bracket 106 is translucent, opaque, or a combination thereof.

Bracket 106 is substantially rectangular in plan view and has a pinched or concave pair of opposing sides between first and second ends. A first end of bracket 106 has a pair of through-holes formed therein and aligned with corresponding threaded receivers in two corners of the base of housing 102. A pair of screws inserted through the through-holes and into the threaded receivers in the base of housing 102 retain the bracket 106 in connection with the housing. In some embodiments, another mechanism is used to attach bracket 106 to housing 102, e.g., glue, snap-fit, or the like. In at least one embodiment, bracket 106 is made of metal for strength. Because bracket 106 is positioned on the bottom of housing 102, the bracket does not obstruct the azimuthal viewing of the emission of light from lighting device 100. Bracket 106 is formed to be flexible in design enabling the second end of the bracket to be flexed away from the base of housing 102. In an embodiment, bracket 106 is formed of a flexible material.

Bracket 106 is usable to attach the lighting device 100 to another object. For example, using bracket 106 the lighting device 100 is clipped to a piece of fabric, cord, or the like.

Lighting device 100 also includes a switch control 112 protruding through a through-hole formed in a side surface of the housing. The switch control 112 is used to control the lighting device 100. In some embodiments, the switch control 112 is a pressure sensitive switch. In some embodiments, the switch control 112 is other than pressure sensitive. The switch control 112 is watertight or water-resistant with respect to the through-hole to prevent water from entering the interior cavity.

Figure 2:
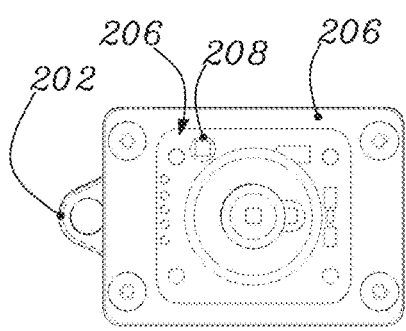
FIG. 2 is a top plan view of an exposed upper surface of the lighting device of FIG. 1, in accordance with an embodiment.

FIG. 2 is a top plan view of an exposed upper surface and interior of the lighting device 100 of FIG. 1, in accordance with an embodiment.

Viewed from the top, lighting device 100 includes a set of four screws retaining optical surface 104 in position. One screw is positioned at each corner of the lighting device 100.

A bracket loop 202 extends away from housing 102 at a side or back surface of the housing. Bracket loop 202 is formed as a part of bracket 106. Bracket loop 202 extends from the first end of bracket 106 and is aligned between the pair of through-holes formed in the bracket. In some embodiments, bracket loop 202 is located at the second end of bracket 106. In some embodiments, bracket loop 202 is located along a length of a side of bracket 106. In some embodiments, bracket loop 202 extends downward from the base of bracket 106.

Bracket loop 202 includes a through opening for receiving a cord. In use, a cord having a knot is threaded through the opening and between the bracket 106 and the base of housing 102 to secure the lighting device 100 to another object. The knot prevents passage of the cord entirely through the opening. The opening is approximately 5 mm in diameter. In some embodiments, the opening has a larger or smaller diameter.

In some embodiments, bracket loop 202 is formed as a part of housing 102.

A top of a controller board 204 is visible through optical surface 104. Controller board 204 controls operation of lighting device 100. In some embodiments, controller board 204 is a circuit board, printed circuit board, or the like. Controller board 204 includes a processor, controller, or other circuitry for controlling operation of lighting device 100.

Optical surface 104 includes a dark activation sensor port 206 extending through the optical surface. Dark activation sensor port 206 is positioned with respect to a dark activation sensor (also referred to as a light sensor) 208 on controller board 204 such that ambient light passes through optical surface 104, by way of dark activation sensor port 206, and is captured by the dark activation sensor. Based on the amount of light captured by the dark activation sensor 208 exceeding or failing to exceed a predetermined threshold level, lighting device 100 is deactivated or activated to emit light, depending on the configuration. In some embodiments, lighting device 100 only emits light based on a determination by the dark activation sensor 208 that the predetermined light threshold level has not been reached.

Figure 3A:
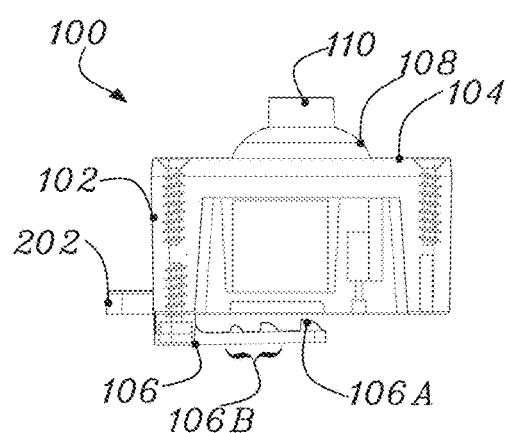
FIG. 3A is a left side view of the lighting device of FIG. 1, in accordance with an embodiment.

FIG. 3A is a left side view of the lighting device 100 of FIG. 1, in accordance with an embodiment.

Bracket 106 extends substantially entirely across the bottom surface of housing 102. Bracket 106 is offset from the bottom surface of the housing 102 to enable a cord, string, cable, or the like to be slid in-between the bracket and the housing. In at least one embodiment, the cord is a military type III parachute cord (550 Cord) as set forth in military specification MIL-C-5040H. Bracket 106 includes a bracket gripping ridge (also referred to as gripping ridge) 106A at the second end extending on the upper surface of the bracket proximal to the housing 102. Gripping ridge 106A extends across bracket 106 perpendicular to the length of the bracket. Gripping ridge 106A contacts the bottom surface of the housing 102.

Two additional gripping ridges (collectively referred to as 106B) are arranged on the upper surface of bracket 106 and spaced apart in the longitudinal direction from the first end to the second end of the bracket. The two additional gripping ridges 106B are configured to grip a cord, string, cable, or the like between the bracket 106 and the housing 102. Gripping ridges 106B extend toward but do not contact bottom surface of housing 102. Gripping ridges 106A, 106B have a sawtooth profile.

In some embodiments, there are a greater or lesser number of gripping ridges 106B. In some embodiments, gripping ridges 106A, 106B have a different shape. In some embodiments, gripping ridges 106A, 106B have a wavy, sawtooth, convex, concave, or other shape extending across bracket 106. In some embodiments, gripping ridges 106A, 106B have a profile other than sawtooth, e.g., half-round, square, or other shape.

Figure 3B:
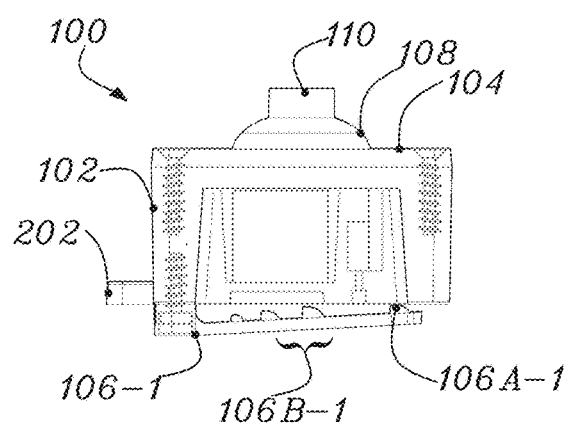
FIG. 3B is a left side view of the lighting device of FIG. 1, in accordance with an embodiment.

FIG. 3B is a left side view of the lighting device 100 of FIG. 1, in accordance with an embodiment. FIG. 3B is the same as FIG. 3A except for bracket 106 is replaced with bracket 106-1.

Bracket 106-1 is shorter in length than bracket 106. Bracket 106-1 includes a gripping ridge 106A-1 further from the end of the bracket due to the longer bracket. Bracket 106-1 includes three additional gripping ridges 106B-1 in place of the two additional gripping ridges 106B of bracket 106.

Figure 4A:
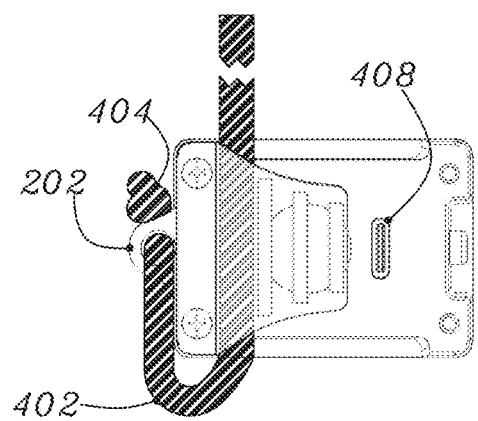
FIG. 4A is a bottom plan view of the lighting device of FIG. 1 with a cord routed therethrough, in accordance with an embodiment.

FIG. 4A is a bottom plan view of the lighting device 100 of FIG. 1 with a cord routed therethrough, in accordance with an embodiment.

Cord 402 includes a knot 404 at an end thereof. The other end of cord 402 is passed through the opening of bracket loop 202 and between bracket 106 and housing 102. Lighting device 100 is thereby secured to cord 402. In other embodiments, cord 402 is routed differently through bracket 106 and bracket loop 202.

Also visible in FIG. 4A is a charging port 408. Housing 102 has a charging port 408 on the bottom surface of the housing for charging the lighting device 100. Charging port 408 is spaced apart from the end of bracket 106 to enable connection of a charging cable or connection to the charging port without requiring removal of bracket 106. In some embodiments, charging port 408 is a USB-based charging port, e.g., USB-C, or the like.

Figure 4B:
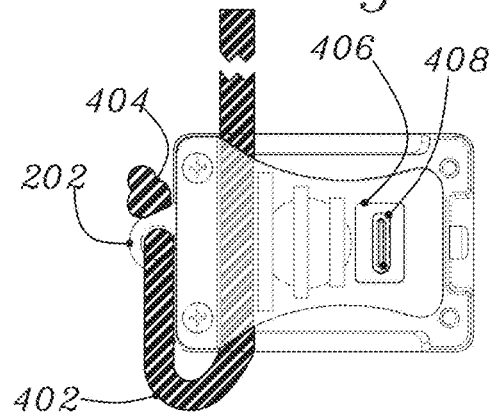
FIG. 4B is a bottom plan view of the lighting device of FIG. 1 with a cord routed therethrough, in accordance with an embodiment.

FIG. 4B is a bottom plan view of the lighting device 100 of FIG. 1 with a cord routed therethrough, in accordance with an embodiment.

Bracket 106-1 has a clearance hole 406 extending through the bracket from one side to the other. Housing 102 has a charging port 408 on the bottom surface of the housing for charging the lighting device 100. Charging port 408 is aligned with clearance hole 406 to enable connection of a charging cable or connection to the charging port without requiring removal of bracket 106-1. In some embodiments, charging port 408 is a USB-based charging port, e.g., USB-C, or the like.

Charging port 408 is used to charge a battery within lighting device 100. In an embodiment, a wireless charging coil is used to charge the battery (e.g., coil 608 of FIG. 6A/6B).

Figure 2A:
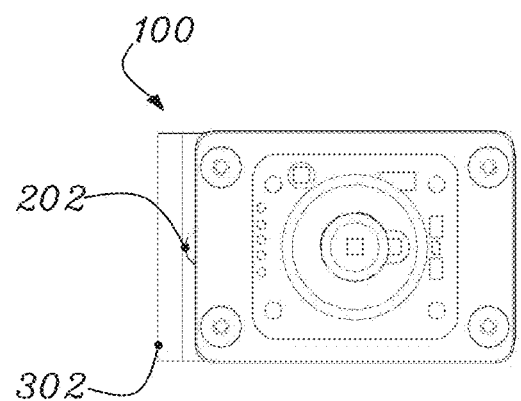
FIG. 2A is a top plan view of an exposed upper surface of the lighting device of FIG. 1, in accordance with an embodiment.

FIG. 2A is a top plan view of an exposed upper surface of the lighting device of FIG. 1, in accordance with an embodiment. FIG. 2A is the same as FIG. 2 except for bracket 106 is replaced with bracket 302. Bracket loop 202 is formed as an opening in a portion of bracket 302.

Bracket 302 is a flexible bent material for forming a clip for retaining lighting device 100 clipped on a surface, line, rope, or similar mechanism. In an embodiment, bracket 302 comprises a metallic material.

Figure 3C:
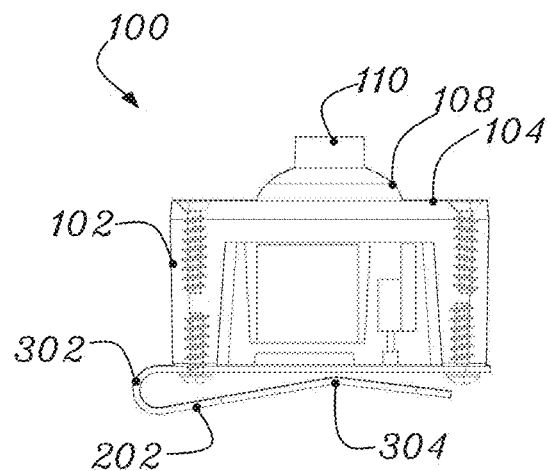
FIG. 3C is a left side view of the lighting device of FIG. 2A, in accordance with an embodiment.

FIG. 3C is a left side view of the lighting device of FIG. 2A, in accordance with an embodiment. Bracket 302 includes a rounded bend at one end and an oblique angle bend 304 toward the middle of the bracket. The oblique angle bend 304 is adject a bottom surface of lighting device 100.

Figure 4C:
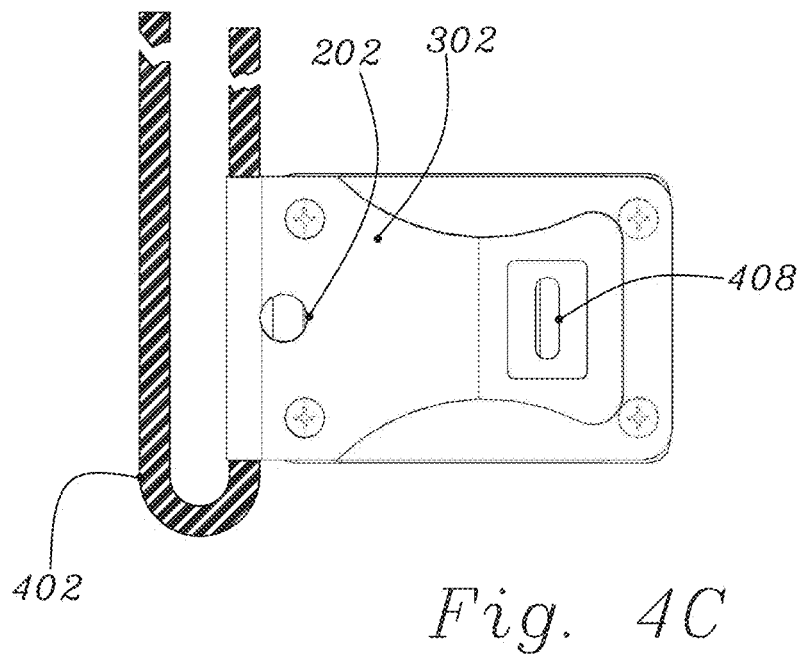
FIG. 4C is a bottom plan view of the lighting device of FIG. 2A, in accordance with an embodiment.

FIG. 4C is a bottom plan view of the lighting device of FIG. 2A, in accordance with an embodiment. Cord 402 is passed between bracket 302 and housing 102. Lighting device 100 is thereby secured to cord 402. In other embodiments, cord 402 is routed differently through bracket 302.

Figure 5:
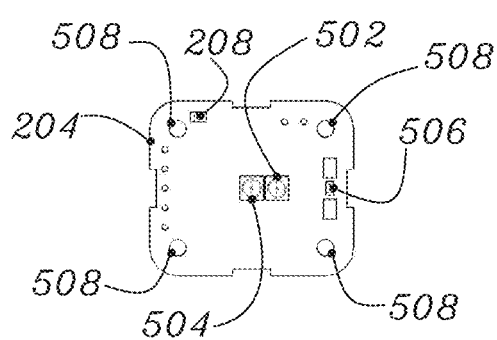
FIG. 5 is a top plan view of a board interior to the lighting device of FIG. 1, in accordance with an embodiment.

FIG. 5 is a top plan view of a controller board 204 interior to the lighting device 100 of FIG. 1, in accordance with an embodiment. Controller board 204 includes components for interfacing with the user via switch 112, the battery to determine charge state, charging, and capacity, the charging port 408 to control charging, the external environment via the dark activation sensor, and the user via light emission. In other embodiments, different and/or additional components are included and in communication with the controller board to provide functionality to lighting device 100.

Figure 19:
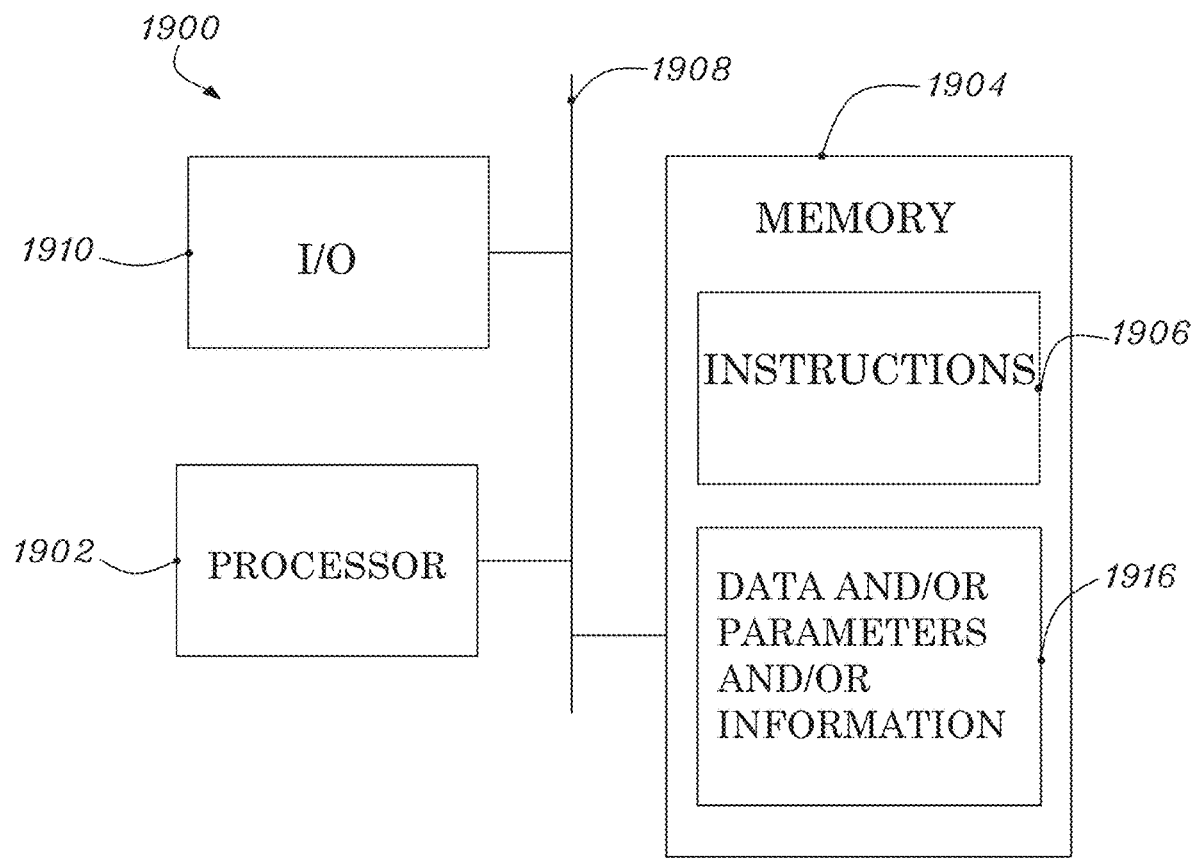
FIG. 19 is a high-level functional block diagram of a controller usable in conjunction with the lighting device of FIG. 1, in accordance with an embodiment.

Controller board 204 is sized to fit within the interior cavity of housing 102. Controller board 204 includes additional components for operation as known to persons of ordinary skill in the art. FIG. 19 is a high-level functional block diagram of components included on controller board 204. Controller board 204 is 27 mm in length and 23 mm in width and has a nominal thickness of less than 1 mm. In other embodiments, controller board 204 has different dimensions. Controller board 204 is soldered to a switch board (not labeled in FIG. 6). In other embodiments, controller board 204 is attached to optical surface 104 with screws, plastic welded, glued, or the like and the switch board is attached to the control board with wires, clips, or the like.

Controller board 204 comprises a first emitter 502 and a second emitter 504 on the upper surface of the board. First and second emitters 502, 504 are configured to emit light in at least one of a visible spectrum and a non-visible spectrum, e.g., infra-red, ultraviolet, or the like. First and second emitters 502, 504 are configured to emit light in a pattern. In some embodiments, first and second emitters 502, 504 emit light in a same pattern synchronously. In some embodiments, first and second emitters 502, 504 emit light in an alternating pattern, e.g., one emits in the visible spectrum and then the other emits in the non-visible spectrum.

First and second emitters 502, 504 are individually controllable by controller board 204. In some embodiments, the controller board 204 is configured to control the first and second emitters 502, 504 to emit light in an alternating pattern including both visible spectrum and non-visible spectrum. In an embodiment in which first and second emitters 502, 504 emit light in an alternating pattern, each spectrum (visible and non-visible spectrum) of light is emitted every two seconds in alternating sequence. In an embodiment in which first and second emitters 502, 504 emit light in the same spectrum, light is emitted (or flashed) one every two seconds. In some embodiments, the controller board 204 is configured to control the first and second emitters 502, 504 to emit light in more than one visible or non-visible spectrum. In some embodiments, the controller board 204 is configured to control the first and second emitters 502, 504 to emit light in a pattern including the visible spectrum in response to the controller board 204 controlling the first and second emitters 502, 504 to emit light in the non-visible spectrum. In some embodiments, the controller board 204 is configured to control the first and second emitters 502, 504 to emit light in a pattern including the visible spectrum in order to alert a user that the lighting device 100 is activated.

First and second emitters 502, 504 are arranged adjacent to each other. First and second emitters 502, 504 are in the central portion of controller board 204. Second emitter 504 is axially aligned with the cylindrical and semispherical protrusions 108, 110. First emitter 502 is immediately adjacent second emitter 504. In some embodiments, first and second emitters 502, 504 are each equidistant from the axial alignment of the cylindrical and semispherical protrusions 108, 110.

An operation emitter (also referred to as a visual indicator) 506 is positioned toward a front edge of the controller board 204 near the switch control 112 and distal from bracket loop 202. Operation emitter 506 is configured to emit light responsive to the lighting device 100 being powered and operating. In an embodiment, operation emitter 506 emits light at a lower output intensity than first and second emitters 502, 504. In an embodiment, operation emitter 506 emits light at an intensity such that it is visible only at a proximity closer than first and second emitters 502, 504 emitted light is visible. In operation, operation emitter 506 is controlled to inform the user when lighting device 100: is turned on by transitioning from a lower light level to a brighter light level; is turned off by transitioning from a brighter light level to a lower light level; is emitting infra-red light by a lower level flash indicating operation of the infra-red spectrum emission; or is at a particular charge level. In at least one embodiment, if lighting device 100 is plugged in to a mains or other power supply the charge level is indicated by: two flashes of operation emitter 506 indicating 0-25% charge, three flashes indicating 25-50% charge, four flashes indicating 50-75% charge; and five flashes indicating 100% charge.

Controller board 204 controls power being provided by battery (602, FIG. 6) and being supplied to first and second emitters 502, 504 and operation emitter 506 in response to activation of switch control 112 by a user.

Controller board 204 includes four through-holes 508 each formed in a corresponding corner of the board. Optical surface 104 includes four corresponding pins extending downward from the interior surface and aligned to extend through the through-holes of the controller board 204 and fix the board in place within housing 102.

Figure 6:
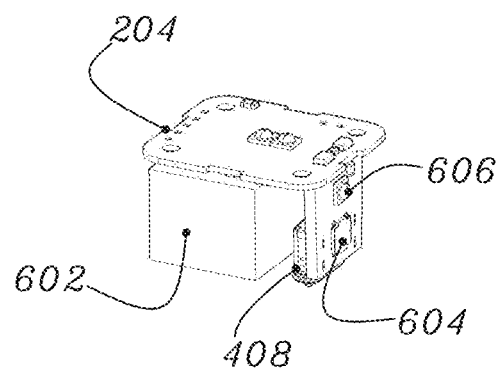
FIG. 6 is a perspective view of the board of FIG. 5, in accordance with an embodiment.

FIG. 6 is a perspective view of the controller board 204 of FIG. 5, in accordance with an embodiment.

A battery 602 is connected with controller board 204 and supplies power to the board. Battery 602 is 21 mm in length, 17 mm in width, and 14 mm in height. In other embodiments, the dimensions of battery 602 vary depending on the size of the cavity in housing 102. Battery 602 is a lithium-polymer-based battery rated for 320 milliamp-hours (mAh). Battery 602 withs 8 grams. In operation, battery 602 is able to operate for approximately 3 weeks continuously and 6 weeks with the dark activation sensor activated. In other embodiments, a larger or smaller number of amp-hours is usable. In other embodiments, a different type of battery is usable, e.g., nickel, alkaline, or the like.

In another embodiment, the battery is a smaller 180 mAh battery. The smaller battery is 21 mm in length, 17 mm in width, and 7 mm in height. In operation, the smaller batter operates for 3 weeks with the dark activation sensor activated. The smaller battery weighs 4 grams.

A switch 604 is activated by switch control 112 and connected to controller board 204. Activation of switch 604 by a user causes controller board 204 to control one or more of first and second emitters 502, 504 and operation emitter 506.

A side emitter 606 is connected with controller board 204. Side emitter 606 is usable as a low-level light source to provide local illumination for the user similar to a diffused flashlight. Side emitter 606 works in conjunction with a transparent housing. In an embodiment, users attach lighting device 100 to a vest or shoulder strap for use as opposed to a tent. Side emitter 606 is positioned in line with a front surface of housing 102.

Charging port 408 is also connected with controller board 204 and provides power from a mains or other power supply to charge battery 602.

Figure 6A:
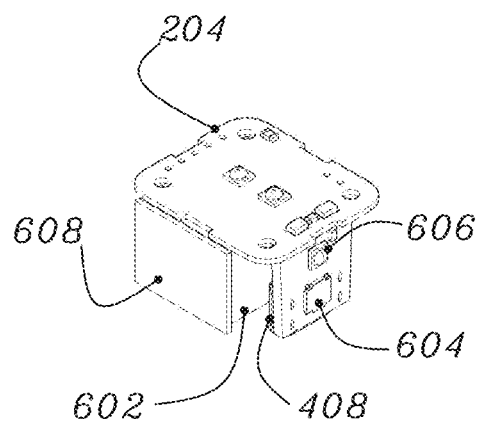
FIG. 6A is a perspective view of the board, in accordance with an embodiment.

FIG. 6A is a perspective view of the controller board 204, in accordance with an embodiment.

In addition to the elements of FIG. 6, the FIG. 6A embodiment includes a wireless charging coil 608 on the side of battery 602. In some embodiments, charging port 408 is not present. Wireless charging coil 608 is used to charge battery 602.

Figure 6B:
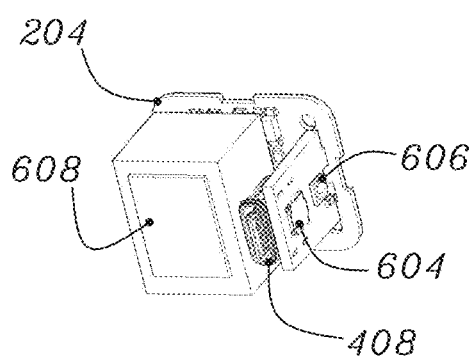
FIG. 6B is a bottom perspective view of the board, in accordance with an embodiment.

FIG. 6B is a bottom perspective view of the controller board 204, in accordance with an embodiment.

The FIG. 6B embodiments includes the wireless charging coil 608 on the bottom of battery 602. In some embodiments, charging port 408 is not present. Wireless charging coil 608 is used to charge battery 602.

Figure 7A:
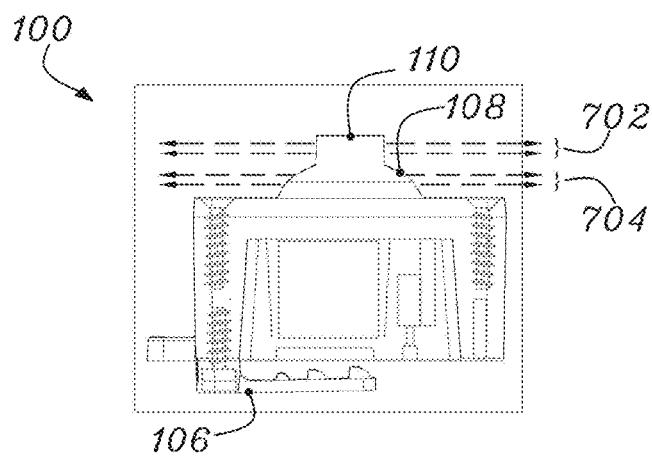
FIG. 7A is a left side view of the lighting device of FIG. 1 including light paths during illumination, in accordance with an embodiment.

FIG. 7A is a left side view of the lighting device 100 of FIG. 1 including light paths during illumination, in accordance with an embodiment.

Upper and lower light rays 702, 704 exit cylindrical protrusion 110 and semispherical protrusion 108 after being emitted by one or both of first and second emitters 502, 504. Upper and lower light rays 702, 704 do not impact another surface of lighting device 100 after exiting optical surface 104. The upper and lower light rays 702, 704 extend away from the axial center of cylindrical and semispherical protrusions 110, 108.

Figure 7B:
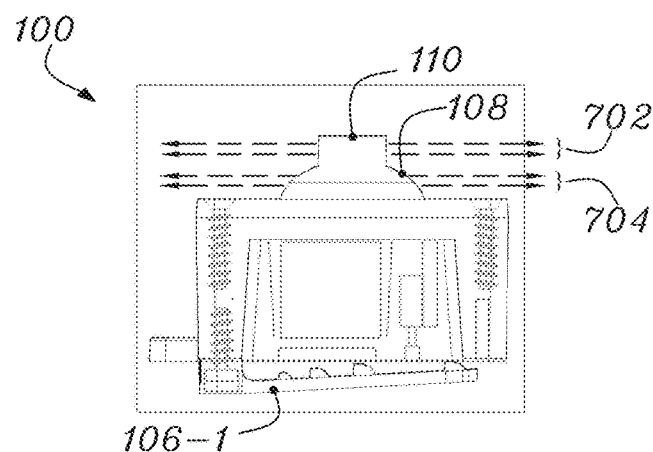
FIG. 7B is a left side view of the lighting device of FIG. 1 including light paths during illumination, in accordance with an embodiment.

FIG. 7B is a left side view of the lighting device 100 of FIG. 1, in accordance with an embodiment. FIG. 7B includes the longer bracket 106-1 in place of bracket 106.

Figure 8:
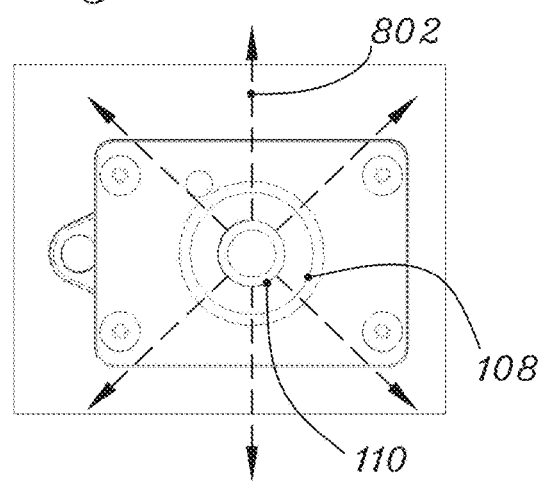
FIG. 8 is a top view of the lighting device of FIG. 1 including light paths during illumination, in accordance with an embodiment.

FIG. 8 is a top view of the lighting device 100 of FIG. 1, in accordance with an embodiment.

Light rays (azimuthal light rays) 802 extend away from substantially the center of the axial alignment of cylindrical protrusion and semispherical protrusion 110, 108. Light rays 802 extend away from lighting device 100 in a 360° radius. No portion of lighting device 100 blocks the emission of light rays 802 in a 360° radius. With lighting device 100 attached or mounted to a highest location of another object, the light emissions from the lighting device are visible for 360° around the object.

Figure 9A:
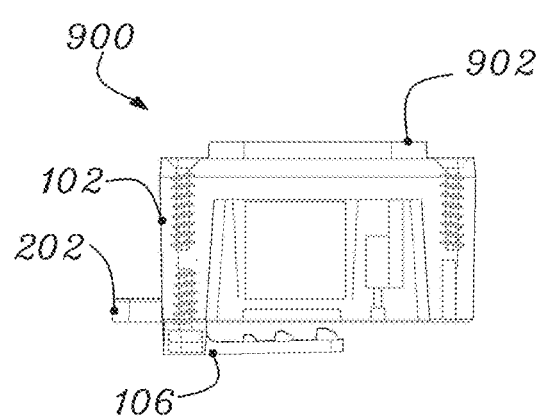
FIG. 9A is a left side view of a lighting device similar to the lighting device of FIG. 1, in accordance with an embodiment.

FIG. 9A is a left side view of a lighting device 900 similar to lighting device 100 of FIG. 1, in accordance with an embodiment.

Lighting device 900 includes an optical surface 902 in place of optical surface 104. Optical surface 902 lacks the semispherical protrusion 108 and cylindrical protrusion 110. Optical surface 902 evenly illuminates the light through a hemisphere. The light emitted is not concentrated in the azimuthal direction, so its visibility is less when approaching the device from the horizontal axis. When mounting lighting device 100 to a user's vest for a location device, lighting device 100 is not held horizontally like when attached to a tent so a more spread-out light is beneficial in these instances.

Figure 9B:
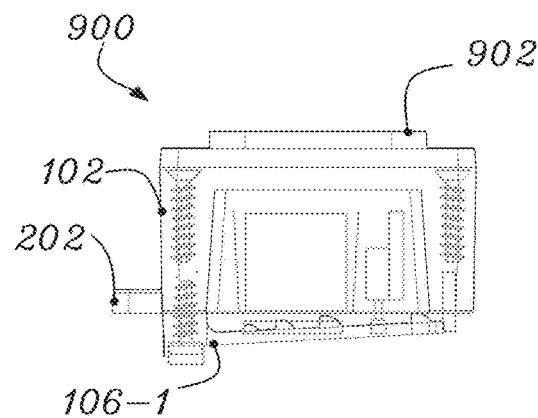
FIG. 9B is a left side view of the lighting device of FIG. 1 with a cover on the upper surface, in accordance with an embodiment.

FIG. 9B is a left side view of a lighting device 900 similar to lighting device 100 of FIG. 1, in accordance with some embodiments. FIG. 9B includes the longer bracket 106-1 in place of bracket 106.

Figure 10A:
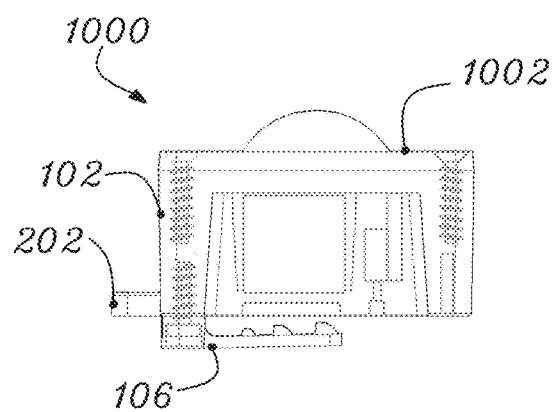
FIG. 10A is a left side view of a lighting device similar to the lighting device of FIG. 1, in accordance with an embodiment.

FIG. 10A is a left side view of the lighting device 100 of FIG. 1 with a cover on the upper surface, in accordance with an embodiment.

Lighting device 1000 includes a semispherical protrusion 1002 in place of cylindrical protrusion and semispherical protrusion 110, 108 of optical surface 104. Lighting device 1000 is shorter in height in comparison with lighting device 100. In some embodiments, semispherical protrusion 1002 extends as far away from the upper surface of the housing 102 as cylindrical protrusion 110.

Figure 10B:
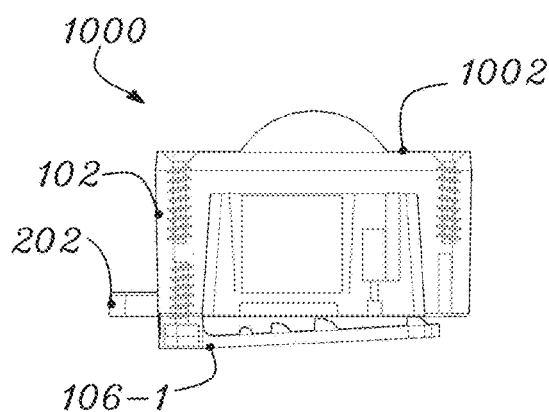
FIG. 10B is a left side view of the lighting device of FIG. 1 with a cover on the upper surface, in accordance with an embodiment.

FIG. 10B is a left side view of the lighting device 100 of FIG. 1 with a cover on the upper surface, in accordance with an embodiment. FIG. 10B includes the longer bracket 106-1 in place of bracket 106.

Figure 11:
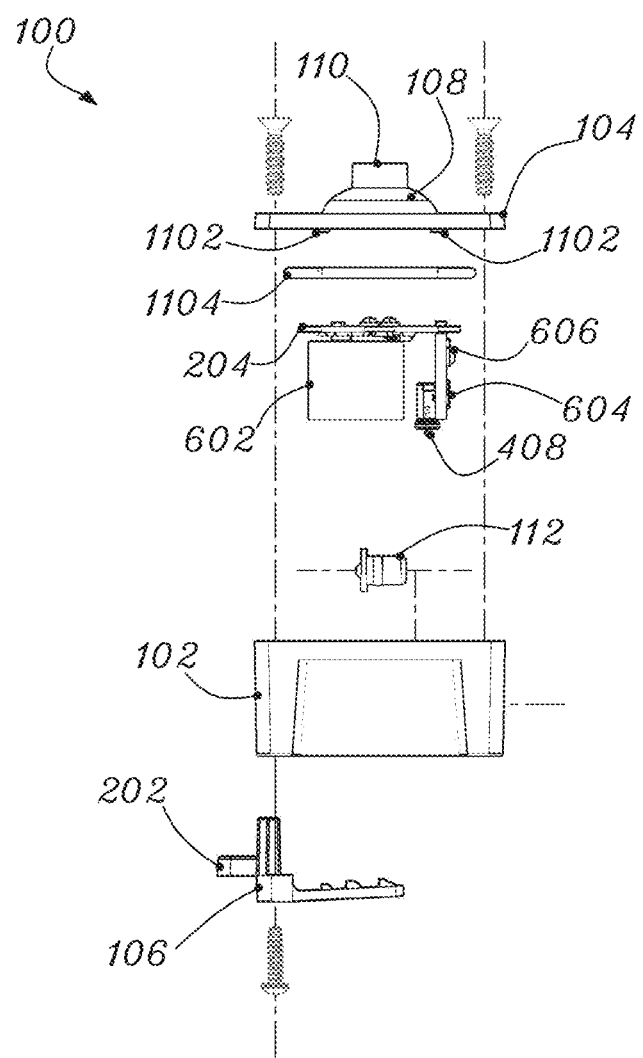
FIG. 11 is an exploded parts diagram of the lighting device of FIG. 1, in accordance with an embodiment.

FIG. 11 is an exploded parts diagram of the lighting device 100 of FIG. 1, in accordance with an embodiment. Optical surface 104 includes prongs 1102 extending from the bottom surface and aligned with controller board 204.

A sealing ring 1104 (also referred to as an "O-ring") is between optical surface 104 and housing 102. Sealing ring 1104 fits within a groove 1702 (FIG. 17) in housing 102.

Figure 12:
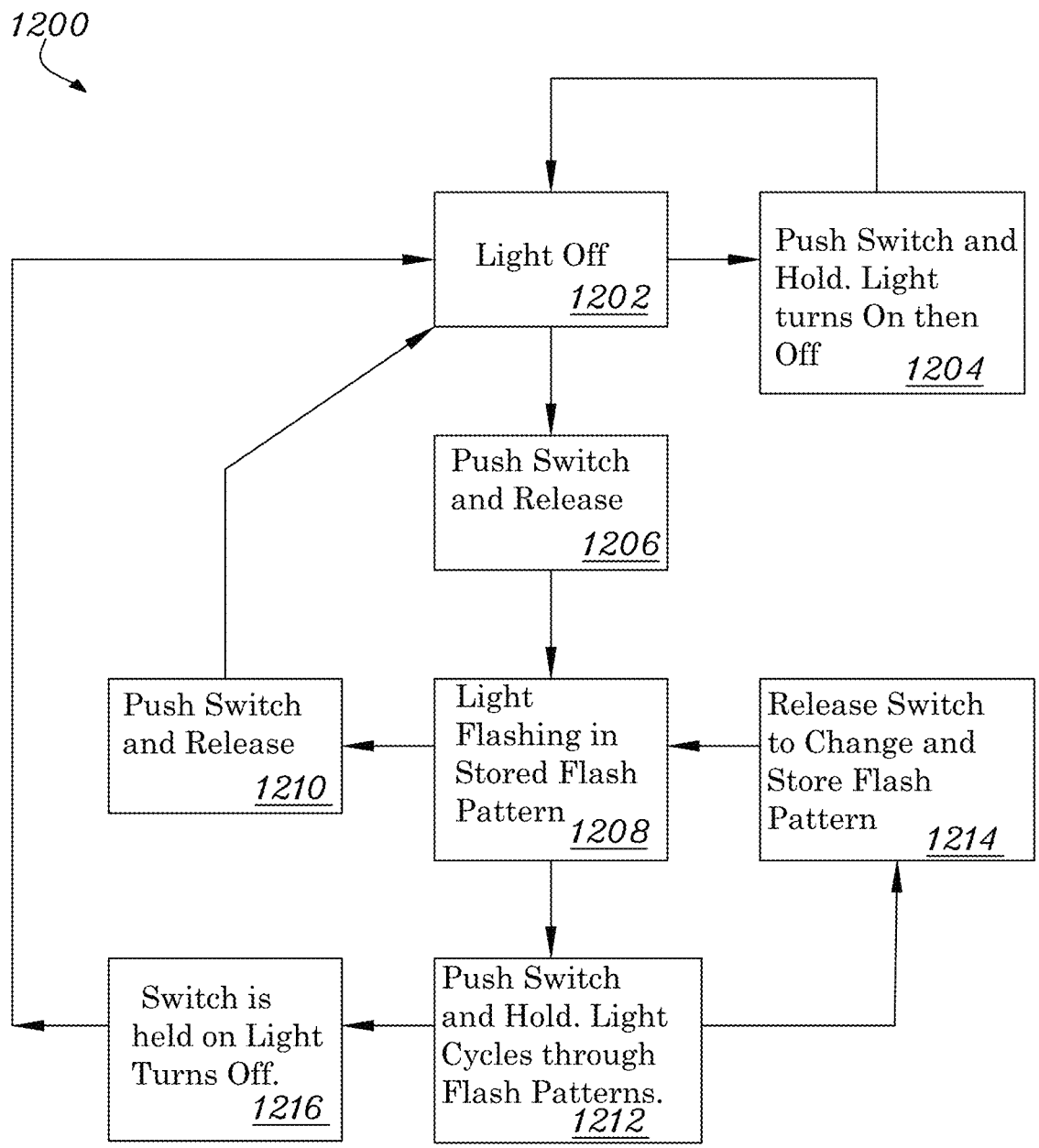
FIG. 12 is a high-level flow diagram of operation of the lighting device of FIG. 1, in accordance with an embodiment.

FIG. 12 is a flow diagram 1200 of the operation flow of lighting device 100, in accordance with an embodiment. At operation 1202, lighting device 100 is in an off state and no light emissions are emitted. If the user depresses and holds the switch control 112, the flow proceeds to operation 1204 and lighting device 100 activates (or turns on) and then deactivates (or turns off). This prevents accidental activation if switch control 112 is unintentionally pressed because the device is not in use. In an embodiment, turn on of the lighting device 100 is indicated by activation of operation emitter 506 increasing from a low intensity output to a high intensity output (off then dim then bright progression). In an embodiment, turn off of the lighting device 100 is indicated by deactivation of operation emitter 506 decreasing from a high intensity output to a low intensity output (bright then dim then off progression). The flow then proceeds to return to operation 1202.

If the user depresses and releases the switch control 112, the flow proceeds to operation 1206 and then to operation 1208. During operation 1208, lighting device 100 emits light in a flash pattern in accordance with a previously selected flash pattern, e.g., as stored in a memory such as storage medium 1904 (FIG. 19). Lighting device 100 continues to emit light via one or more of first emitter 502, second emitter 504, or operation emitter 506 in accordance with the flash pattern.

If the user depresses and releases switch control 112, the flow proceeds to return to operation 1202 via operation 1210 and the lighting device 100 turns off.

If the user depresses and holds switch control 112, the flow proceeds to operation 1212. During operation 1212, lighting device 100 cycles through various predetermined flash patterns of emitters 502, 504, 506. The flash patterns are stored in memory such as storage medium 1904 (FIG. 19). In one or more embodiments, the flash patterns include the emission of visible spectrum light and/or infra-red spectrum light from one or more emitters 502, 504. In at least one embodiment, operation emitter 506 flashes a lower intensity visible spectrum light emission synchronously with an infra-red spectrum light emission. In at least one embodiment, operation emitter 506 emits light in an amber spectrum of light. In at least one embodiment, first and second emitters 502, 504 emit light in an alternating pattern with one emitter emitting visible spectrum light and the other emitting infra-red spectrum light. In other embodiments, different patterns of light emission are emitted from emitters 502, 504, 506.

In at least one embodiment, side emitter 606 is caused to emit visible light as one of the flash patterns accessible via the user selection of a flash pattern in accordance with operation 1212. In at least one embodiment, side emitter 606 emits light by itself, i.e., without one of emitters 502, 504, 506, or in combination with one or more of emitters 502, 504, 506.

If the user releases switch control 112 during the cycling of the flash patterns, the flow proceeds to operation 1214 and the flash pattern that last flashed is set as the current (also referred to as the selected) flash pattern and the lighting device 100 proceeds to emit light in accordance with the flash pattern in operation 1208. The selected flash pattern is stored in memory.

If the user continues to hold switch control 112 during the cycling of the flash patterns beyond a predetermined time period, the flow proceeds to operation 1216 and the lighting device 100 is turned off. In some embodiments, the predetermined time period is 15 seconds. In some embodiments, the predetermined time period is a length of time sufficient to cycle through the flash patterns twice.

Figure 13:
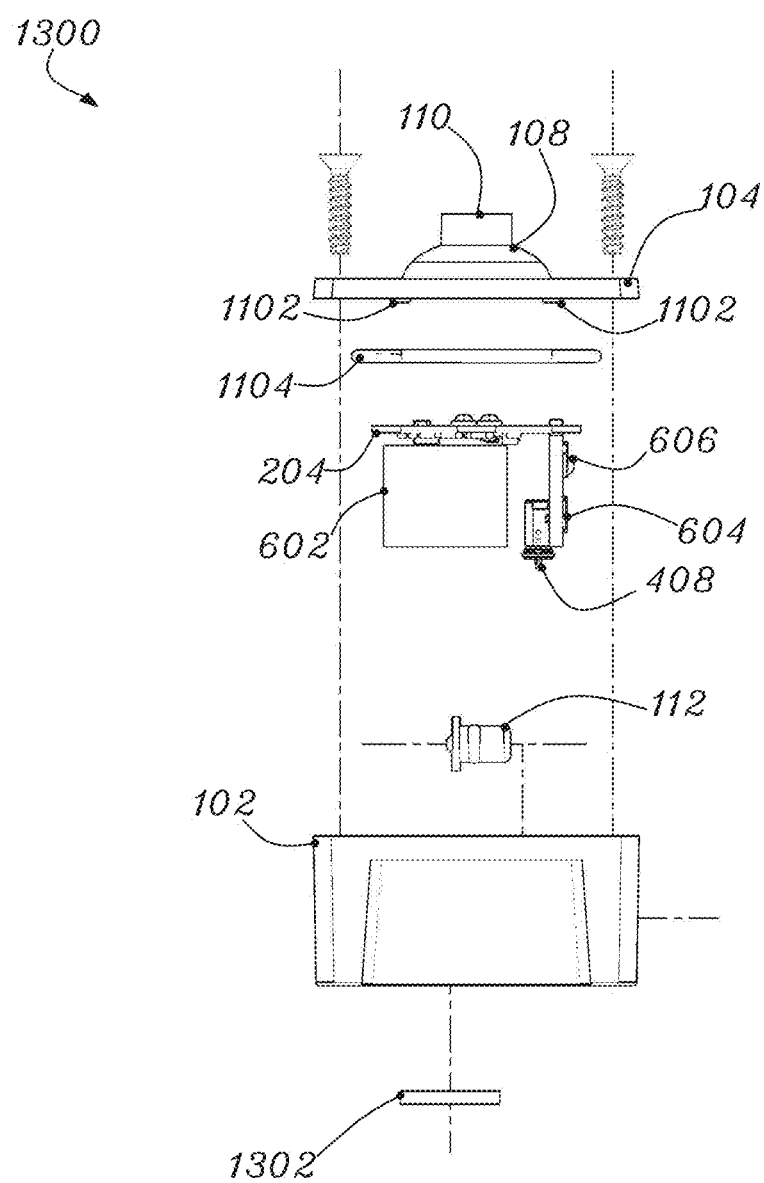
FIG. 13 is an exploded parts diagram of a lighting device similar to the lighting device of FIG. 1, in accordance with an embodiment.

FIG. 13 is an exploded parts diagram of a lighting device 1300 similar to lighting device 100 of FIG. 1, in accordance with an embodiment. Lighting device 1300 lacks bracket 106 and in place includes a magnet base 1302. Magnet base 1302 is glued to the bottom surface of housing 102. In another embodiment, magnet base 1302 is affixed using screws, friction or press-fit, or the like.

Figure 14:
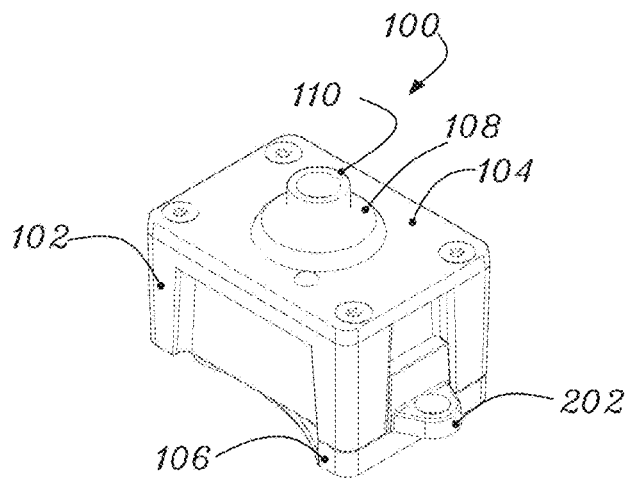
FIG. 14 is a reverse perspective view of the lighting device of FIG. 1, in accordance with an embodiment.

FIG. 14 is a reverse perspective view of the lighting device of FIG. 1, in accordance with an embodiment. Dark activation sensor 206 and bracket loop 202 are visible in FIG. 14.

Figure 15:
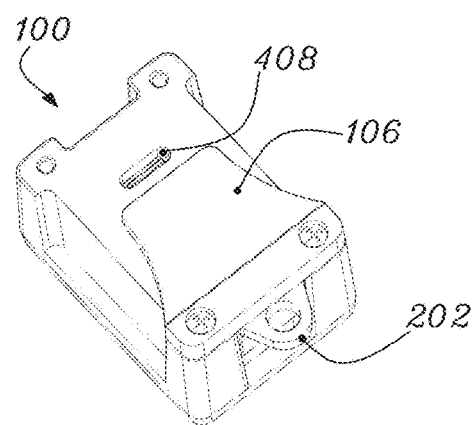
FIG. 15 is a bottom perspective view of the lighting device of FIG. 1, in accordance with an embodiment.

FIG. 15 is a bottom perspective view of the lighting device of FIG. 1, in accordance with an embodiment. Charging port 408 and bracket loop 202 are visible in FIG. 15.

Figure 16:
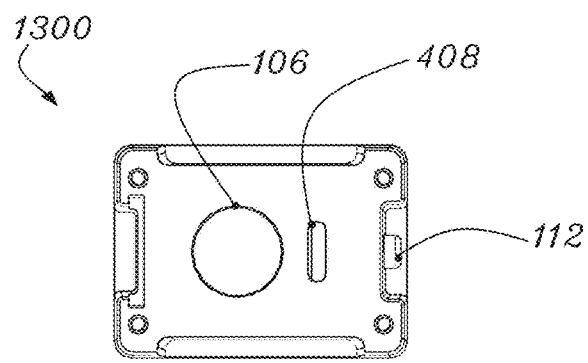
FIG. 16 is a bottom plan view of the lighting device of FIG. 1, in accordance with an embodiment.

FIG. 16 is a bottom plan view of the lighting device of FIG. 13, in accordance with an embodiment. Magnet base 1302 and charging port 408 are visible in FIG. 16. Magnet base 1302 is circular in FIG. 16. In at least some embodiments, magnet base 1302 has a different shape, e.g., square, rectangular, oval, triangular, or the like.

Figure 17:
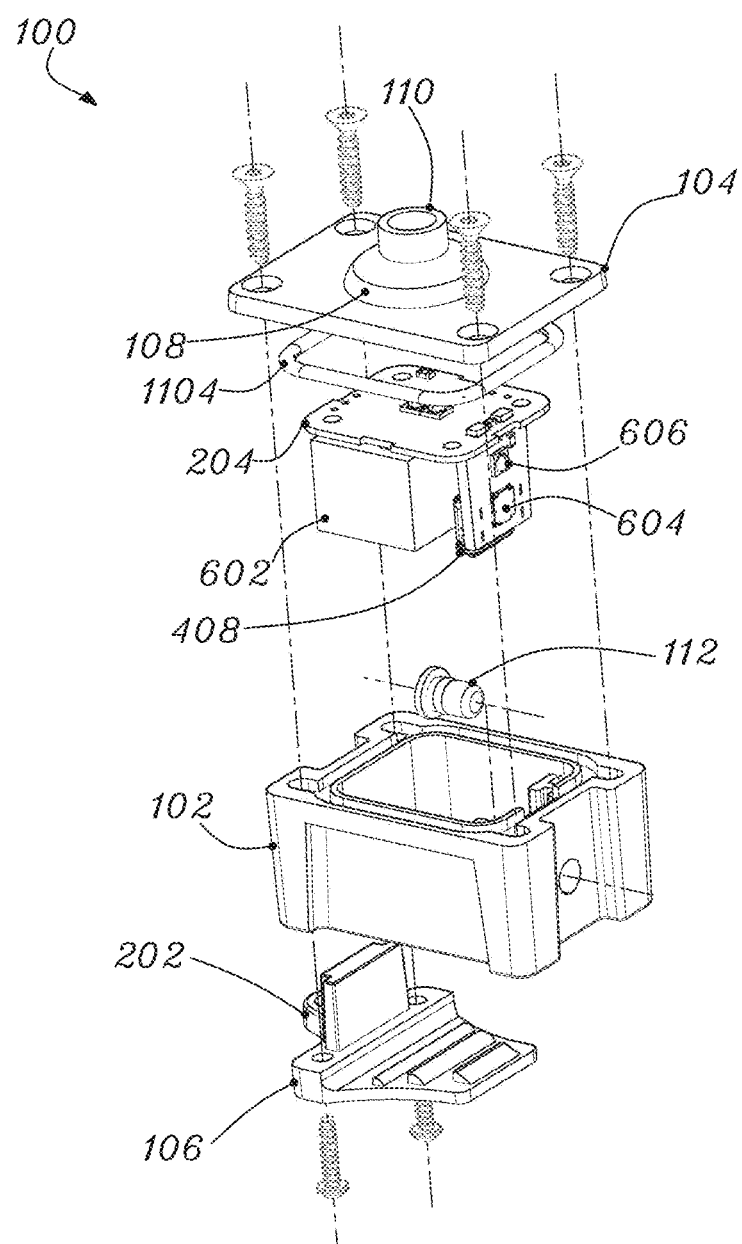
FIG. 17 is a perspective exploded parts diagram of the lighting device of FIG. 1, in accordance with an embodiment.

FIG. 17 is a perspective exploded parts diagram of the lighting device of FIG. 1, in accordance with an embodiment. Sealing ring 1104 corresponds to a groove 1702 in an upper portion of housing 102. Sealing ring 1104 placed in groove 1702 when optical surface 104 is sealed against housing 102 seals the interior cavity of the housing from external contaminants, e.g., dust, dirt, water, or the like.

Figure 18:
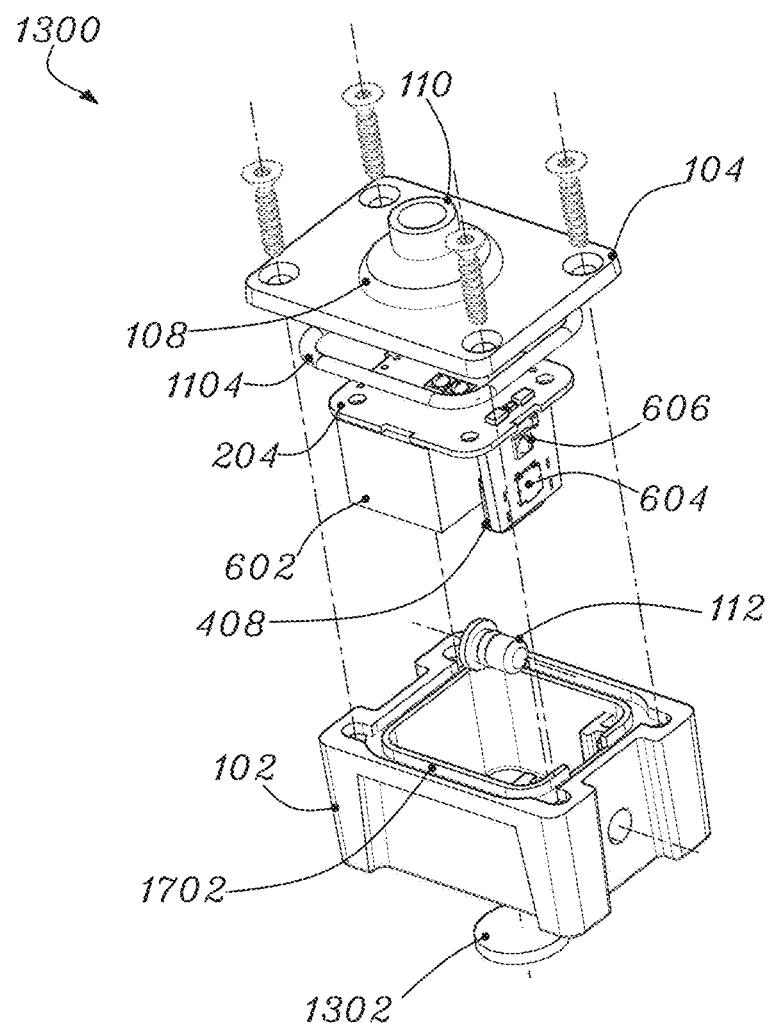
FIG. 18 is a perspective exploded parts diagram of the lighting device of FIG. 13, in accordance with an embodiment.

FIG. 18 is a perspective exploded parts diagram of the lighting device of FIG. 13, in accordance with an embodiment. Sealing ring 1104 corresponds to a groove 1702 in an upper portion of housing 102. Sealing ring 1104 placed in groove 1702 when optical surface 104 is sealed against housing 102 seals the interior cavity of the housing from external contaminants, e.g., dust, dirt, water, or the like.

FIG. 19 is a high-level block diagram of a controller usable in conjunction with the lighting device of FIG. 1, in accordance with an embodiment.

In FIG. 19, system 1900 includes a hardware processor 1902 and a non-transitory, computer readable storage medium 1904 encoded with, i.e., storing, the computer program code 1906, i.e., a set of executable instructions. The processor 1902 is electrically coupled to the computer readable storage medium 1904 via a bus 1908. The processor 1902 is also electrically coupled to an I/O interface 1910 by bus 1908. In some embodiments, all components 1902, 1904, 1908, 1910 are integrated into a single component. The processor 1902 is configured to execute the computer program code 1906 encoded in the computer readable storage medium 1904 in order to cause system 1900 to be usable for performing a portion or all of the processes or methods in accordance with one or more of the embodiments as described above.

In some embodiments, the processor 1902 is a central processing unit (CPU), a multi-processor, a distributed processing system, an application specific integrated circuit (ASIC), and/or a suitable processing unit.

In some embodiments, the computer readable storage medium 1904 is an electronic, magnetic, optical, electromagnetic, infrared, and/or a semiconductor system (or apparatus or device). For example, the computer readable storage medium 1904 includes a semiconductor or solid-state memory, a random-access memory (RAM), and/or a read-only memory (ROM).

In some embodiments, the storage medium 1904 stores the computer program code 1906 configured to cause system 1900 to perform a method as describe herein. In some embodiments, the storage medium 1904 also stores information used for performing the method as well as information generated during performing the method, such as data and/or parameters and/or information 1916 and/or a set of executable instructions 1906 to perform the processes or methods in accordance with one or more of the embodiments as described above.

System 1900 includes I/O interface 1910. I/O interface 1910 is able to be coupled to external circuitry. In some embodiments, I/O interface 1910 includes a switch, sensor and/or other input device for communicating information and commands to processor 1902. In some embodiments, I/O interface 1910 includes a light emitting diode (LED) or other electronic device.

System 1900 is configured to receive information through I/O interface 1910. The information is transferred to processor 1902 via bus 1908.

In some embodiments, a lighting device comprises a housing; an at least partially transparent protrusion connected with a first surface of the housing; a light source within the protrusion, the light source being configured to emit light in a visible spectrum and a non-visible spectrum; a controller within the housing and configured to control the light source to emit light in a pattern including both visible spectrum and non-visible spectrum; a power source within the housing and electrically connected with the controller and the light source; a bracket connected with a second surface of the housing; a light sensor connected with the controller and configured to provide input to the controller based on a level of light detected by the light sensor; and a switch extending through a third surface of the housing and configured to provide input to the controller.

In some embodiments, the controller is configured to control the light source to emit light in an alternating pattern including both visible spectrum and non-visible spectrum. In some embodiments, the controller is configured to control the light source to emit light in more than one visible or non-visible spectrum. In some embodiments, the light source comprises more than one light emitting diode. In some embodiments, the housing is a substantially rectangular parallelepiped. In some embodiments, the first surface is an upper surface of the housing. In some embodiments, the second surface is a lower surface of the housing. In some embodiments, the first surface is opposite the second surface. In some embodiments, the bracket in connection with the housing forms a cord lock configured to retain parachute cord therein. In some embodiments, the bracket in connection with the housing forms a cord lock configured to retain 550 parachute cord therein. In some embodiments, the bracket comprises one or more ridges formed on a same surface of the bracket. In some embodiments, at least one of the housing and the bracket are substantially transparent. In some embodiments, the controller is configured to control the light source to emit light in a pattern including the visible spectrum in response to the controller controlling the light to emit light in the non-visible spectrum.

In some embodiments, the controller is configured to control the light source to emit light in a pattern including the visible spectrum in order to alert a user that the device is activated. In some embodiments, the controller is configured to change the light emitted in the visible spectrum and the non-visible spectrum in response to input from the switch.

In some embodiments, the controller is configured to change the pattern of the light emitted in the visible spectrum and the non-visible spectrum in response to input from the switch. In some embodiments, the housing and the bracket are transparent. In some embodiments, the light sensor is within the housing and arranged to face an at least partially transparent surface of the housing. In some embodiments, the light sensor is below the first surface of the housing and the first surface is at least partially transparent.

In some embodiments, the controller is configured to control the light source to emit light in a different pattern including both visible spectrum and non-visible spectrum in response to input from the light sensor indicating detection of light below a threshold value. In some embodiments, the controller is configured to control the light source to emit light in a different pattern including both visible spectrum and non-visible spectrum in response to input from the light sensor indicating detection of light above a threshold value. In some embodiments, the light source is configured to emit light in a 360 radius through the protrusion. In some embodiments, the lighting device further comprises a power port in a fourth surface of the housing and configured to electrically connect the power source with an external power supply. In some embodiments, the second surface and the fourth surface are the same surface and the bracket has an opening formed therethrough to allow connection between the power port and the external power supply through the opening.

In some embodiments, the controller is configured to control the light source to emit light in response to input from the light sensor indicating detection of light below a threshold value and to not emit light in response to input from the light sensor indicating detection of light at or above a threshold value. In some embodiments, the protrusion has a semispherical portion and a cylindrical portion stacked on the semispherical portion. In some embodiments, the semispherical portion is between the first surface and the cylindrical portion. In some embodiments, at least one of the semispherical portion and the cylindrical portion is transparent. In some embodiments, the protrusion extends above the first surface of the housing.

In some embodiments, the protrusion is the highest portion of the lighting device in a side view. In some embodiments, the controller is configured to control the light source to emit light in a pattern including both visible spectrum and non-visible spectrum at the same time. In some embodiments, the lighting device further comprises a visual indicator configured to display an indication to the user that the device is powered on. In some embodiments, the visual indicator pulses when the device is powered on.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A lighting device comprising:
   a housing;
   an at least partially transparent protrusion connected with a first surface of the housing;
   a light source within the protrusion, the light source being configured to emit light in a visible spectrum and a non-visible spectrum, wherein the light source is configured to emit infra-red light for the non-visible spectrum, and the light source is configured to emit light in a 360 radius through the protrusion;
   a controller within the housing and configured to control the light source to emit light in a pattern including both visible spectrum and non-visible spectrum;
   a second surface of the housing opposite the first surface;
   a power source within the housing and electrically connected with the controller and the light source, the power source configured to provide sufficient power to the lighting device to operate for at least 3 weeks of operation without recharging or replacing the power source; and
   a switch extending through a third surface of the housing and configured to provide input to the controller.

2. The lighting device of claim 1, wherein the controller is configured to control the light source to emit light in an alternating pattern including both visible spectrum and non-visible spectrum.

3. The lighting device of claim 1, wherein the controller is configured to control the light source to emit light in a pattern including both visible spectrum and non-visible spectrum at the same time.

4. The lighting device of claim 1, wherein the controller is configured to control the light source to emit light in more than one visible or non-visible spectrum.

5. The lighting device of claim 1, wherein the light source comprises more than one light emitting diode.

6. The lighting device of claim 1, wherein the housing is a substantially rectangular parallelepiped.

7. The lighting device of claim 1, wherein the first surface is an upper surface of the housing.

8. The lighting device of claim 1, wherein the second surface is a lower surface of the housing.

9. The lighting device of claim 1, further comprising:
   a bracket connected with the second surface of the housing.

10. The lighting device of claim 9, wherein the bracket comprises one or more ridges formed on a same surface of the bracket.

11. The lighting device of claim 9, further comprising a power port in a fourth surface of the housing and configured to electrically connect the power source with an external power supply, and
    wherein the second surface and the fourth surface are the same surface and the bracket has an opening formed therethrough to allow connection between the power port and the external power supply through the opening.

12. The lighting device of claim 9, wherein at least one of the housing and the bracket are substantially transparent.

13. The lighting device of claim 1, further comprising:
    a magnet connected with the second surface of the housing.

14. The lighting device of claim 1, further comprising:
    a visual indicator wherein the controller is configured to control the visual indicator to emit light in a pattern including the visible spectrum in response to the controller controlling the light to emit light in the non-visible spectrum in order to at least one of the following:
    let the user know that the non-visible spectrum is being emitted; or
    let the user know that the device is activated.

15. The lighting device of claim 1, wherein the controller is configured to change the light emitted in the visible spectrum and the non-visible spectrum in response to input from the switch.

16. The lighting device of claim 1, wherein the controller is configured to change the pattern of the light emitted in the visible spectrum and the non-visible spectrum in response to input from the switch.

17. The lighting device of claim 1, wherein the housing and the bracket are transparent.

18. The lighting device of claim 1, further comprising:
    a light sensor connected with the controller and configured to provide input to the controller based on a level of ambient light detected by the light sensor.

19. The lighting device of claim 18, wherein the power source is configured to provide sufficient power to the lighting device to operate for at least 3 weeks of operation without recharging or replacing the power source responsive to input from the light sensor.

20. The lighting device of claim 18, wherein the light sensor is within the housing and arranged to face an at least partially transparent surface of the housing.

21. The lighting device of claim 18, wherein the light sensor is below the first surface of the housing and the first surface is at least partially transparent.

22. The lighting device of claim 18, wherein the controller is configured to control the light source to emit light in a pattern including both visible spectrum and non-visible spectrum in response to input from the light sensor indicating detection of light below a threshold value.

23. The lighting device of claim 18, wherein the controller is configured to control the light source to emit light in a pattern including both visible spectrum and non-visible spectrum in response to input from the light sensor indicating detection of light above a threshold value.

24. The lighting device of claim 18, wherein the controller is configured to control the light source to emit light in response to input from the light sensor indicating detection of light below a threshold value and to not emit light in response to input from the light sensor indicating detection of light at or above a threshold value.

25. The lighting device of claim 1, further comprising:
    a power port in a fourth surface of the housing and configured to electrically connect the power source with an external power supply to recharge the power source, and;
    a visual indicator to indicate at least one of:
    the current charging level of the power source or a fully charged status.

26. The lighting device of claim 1, further comprising:
    a visual indicator configured to display an indication to the user that the device is powered on or powered off.

27. The lighting device of claim 26, wherein the visual indicator pulses in response to the device being powered on or powered off.

28. The lighting device of claim 26, wherein the visual indicator transitions from dim to bright in response to the lighting device being powered on.

29. The lighting device of claim 26, wherein the visual indicator transitions from bright to dim in response to the lighting device being powered off.

30. A lighting device comprising:
a housing;
an at least partially transparent protrusion connected with a first surface of the housing;
a light source within the protrusion, the light source being configured to emit light in a visible spectrum and a non-visible spectrum, wherein the light source is configured to emit infra-red light for the non-visible spectrum;
a controller within the housing and configured to control the light source to emit light in a pattern including both visible spectrum and non-visible spectrum;
a second surface of the housing opposite the first surface;
a power source within the housing and electrically connected with the controller and the light source, the power source configured to provide sufficient power to the lighting device to operate for at least 3 weeks of operation without recharging or replacing the power source; a switch extending through a third surface of the housing and configured to provide input to the controller; and
a bracket connected with the second surface of the housing, wherein the bracket in connection with the housing forms a cord lock configured to retain parachute cord therein.

31. The lighting device of claim 30, wherein the bracket in connection with the housing forms a cord lock configured to retain 550 parachute cord therein.

32. The lighting device of claim 30, wherein the light source is configured to emit light in a 360 radius through the protrusion.

33. A lighting device comprising:
a housing;
an at least partially transparent protrusion connected with a first surface of the housing, wherein the protrusion has a semispherical portion and a cylindrical portion stacked on the semispherical portion;
a light source within the protrusion, the light source being configured to emit light in a visible spectrum and a non-visible spectrum, wherein the light source is configured to emit infra-red light for the non-visible spectrum;
a controller within the housing and configured to control the light source to emit light in a pattern including both visible spectrum and non-visible spectrum;
a second surface of the housing opposite the first surface;
a power source within the housing and electrically connected with the controller and the light source, the power source configured to provide sufficient power to the lighting device to operate for at least 3 weeks of operation without recharging or replacing the power source; and a switch extending through a third surface of the housing and configured to provide input to the controller.

34. The lighting device of claim 33, wherein the semispherical portion is between the first surface and the cylindrical portion.

35. The lighting device of claim 33, wherein at least one of the semispherical portion and the cylindrical portion is transparent.

36. The lighting device of claim 33, wherein the protrusion extends above the first surface of the housing.

37. The lighting device of claim 33, wherein the protrusion is the highest portion of the lighting device in a side view.

* * * * *